United States Patent [19]
Jordan

[11] Patent Number: 6,039,379
[45] Date of Patent: Mar. 21, 2000

[54] SECURITY COVER FOR PICK-UP TRUCK BEDS

[76] Inventor: Hakikta Najin Jordan, HC04 Box 9130, Palmer, Ak. 99645

[21] Appl. No.: 09/334,198

[22] Filed: Jun. 16, 1999

Related U.S. Application Data

[62] Division of application No. 08/934,822, Sep. 22, 1997.

[51] Int. Cl.⁷ .................................................... B62D 33/02
[52] U.S. Cl. .................. 296/37.6; 296/39.2; 296/100.04
[58] Field of Search .............................. 296/37.6, 100.04, 296/39.2, 100.03; 224/403, 404

[56] References Cited

U.S. PATENT DOCUMENTS

| | | | |
|---|---|---|---|
| 4,199,188 | 4/1980 | Albrecht et al. | 296/100.04 |
| 4,451,075 | 5/1984 | Canfield | 296/37.6 |
| 4,750,773 | 6/1988 | Chapline et al. | 296/37.6 |
| 4,943,194 | 7/1990 | Aguilar | 296/37.6 |
| 5,201,561 | 4/1993 | Brown | 296/37.6 X |
| 5,899,544 | 5/1999 | James et al. | 296/37.6 X |
| 5,927,783 | 7/1999 | Baka | 296/37.6 |

FOREIGN PATENT DOCUMENTS

| | | | |
|---|---|---|---|
| 2062499 | 1/1993 | Canada | 296/37.6 |

*Primary Examiner*—D. Glenn Dayoan
*Assistant Examiner*—Jason Morrow
*Attorney, Agent, or Firm*—Michael J. Tavella

[57] ABSTRACT

A series of removable solid cover pieces that are fitted into channels mounted into the side walls of a pick-up truck bed used as a covered storage system. Horizontal channels are interspersed with vertical channels. The vertical channels divide the bed into three sections. Three flat, solid cover sections are used to cover the bed. In this way, the bed can be covered with one, two or three sections, as desired. The flat covers are slid into position in the horizontal channels. The vertical channels are used to secure a rear plate that seals the covers to prevent unauthorized entry. A hasp type lock is used to secure the rear plate to the covers. A second embodiment uses a molded bed liner to form the channels. In this embodiment, the horizontal channel has slots that permit the covers to be dropped down into position instead of being slid the length of a channel.

3 Claims, 9 Drawing Sheets

SECURITY COVER FOR PICK-UP TRUCK BEDS

This is a division of application Ser. No. 08/934,822, filed Sep. 22, 1997.

This invention relates to security cover for pick-up truck beds and particularly to security cover for pick-up truck beds that can selectively cover portions of the truck bed.

BACKGROUND OF THE INVENTION

Pick-up trucks have become one of the most popular and versatile vehicles in use today. These trucks have an enclosed cab and an open bed in the rear of the truck that allows all types of things to be carried. Despite this versatility, the open truck bed has two significant problems. First, the open bed with a closed tailgate produces significant drag on the vehicle when in motion. This reduces the fuel efficiency of the vehicle. The second problem is security. Anything stored in an open bed is subject to quick and easy theft; or at worst, is unprotected from weather.

To solve these problems, several types of covers have been designed to close the bed. The covers not only reduce drag, but protect any contents from the weather and may deter theft. The simplest type of cover is a piece of canvas or vinyl that is fitted over the top of the bed and tied or fastened down to the truck. Although such a cover may help improve fuel efficiency, it does little to keep out a thief. Moreover, such a cover with multiple tie points is difficult to remove and install when the cover is not needed.

Some examples of cover designs are found in the following U.S. Patents: U.S. Pat. No. 5,257,850 teaches a retractable cover for pick-up beds. This cover has a bed liner with slots and a tool carrier mounted near the cab. A soft cover is attached to a rod, which can be pulled from the tool carrier. In this way, the cover can be extended over the bed of the truck. When not needed, the cover can be retracted into the tool carrier. This design may also be motorized so that the cover is extended or retracted automatically. The problem with this design is that it requires a special truck bed liner and a tool tray. While these parts may be desirable for many people, many others do not want or need these parts. Finally, the cover itself is flexible plastic or canvas. As noted above, a thief can cut through the cover eliminating its value. U.S. Pat. No. 5,067,766 teaches a solid bed cover that cannot be easily cut. This cover is designed in two sections. The forward section rides against the cab. A rear slidable cover is fitted under the forward cover. In general use, the cover rests in tracks. The rear cover can be slid forward or backward as desired. If needed, the front cover may also be slid rearward to gain access to the forward part of the bed. In this design, the cover is designed for strength so that items that cannot fit under the cover may be carried on top of the cover. Although this design has several nice features, it has some significant limitations. If the entire bed is needed to carry large items, the cover must be completely removed and stored away from the vehicle. The device uses tracks and other sliding parts that can get dirty and may jam of fail to operate properly. Finally, the system is complex to install and operate. Such complexity increases the cost of the product and the likelihood of product failure. Finally, U.S. Pat. No. 4,673,209 teaches a truck bed cover that rises upwards above the bed for access. This cover is attached to a set of spring-loaded arms that are mounted in the corners of the bed. To open the cover, one "raises the roof" so to speak, by lifting the cover on the arms. Once raised, the cover can be locked into position for carrying large items or to gain long term access to the bed. Again, although this is a workable cover design, it has limitations. First, the cover is one piece and fits over the entire bed. To carry very tall objects, the cover must be removed completely. Second, the spring-loaded arms can jam and fail to operate properly. Finally, operating the cover appears to be a cumbersome task and may be difficult for one person to operate.

BRIEF SUMMARY OF THE INVENTION

The instant invention overcomes these difficulties. It uses a series of removable solid cover pieces that are fitted into channels mounted into the side walls of the bed. Once installed, there is little maintenance of these channels. A set of horizontal channels is interspersed with vertical channels. The vertical channels are designed to divide the bed into three sections. Three flat, solid cover sections are used to cover the bed. In this way, the bed can be covered with one, two or three sections, as desired. The flat covers are slid into position in the horizontal channels. The vertical channels are used to secure a rear plate. This rear plate seals the cover to prevent unauthorized entry. It runs from the covers to the floor of the bed. A hasp type lock is attached to the rear plate that engages the mating portion of the hasp that is found on all the flat covers. Thus, if one cover section is desired, the cover is slid into place, and the rear plate is then dropped into the first set of vertical channels. The rear plate is then secured to the top cover with a lock, thereby securing the items held under the cover. By only using one or two covers, a portion of the bed is kept open and is available to hold large items.

A second embodiment uses a molded bed liner to form the channels. In this embodiment, the horizontal channel has slots that permit the cover panels to be dropped down into position instead of being slid the length of a channel.

When not needed at all, the large cover pieces can be tied together and secured to the rear plate. This bundle of covers can then be stored in the bed of the truck, ready for use as needed.

It is an object of this invention to provide a cover for pick-up truck beds that is easy and quick to install.

It is another object of this invention to produce a cover for a pick-up truck bed that can be adjusted as desired to cover only selected portions of the truck bed.

It is a further object of this invention to produce a cover for a pick-up truck bed that can secure items stored under the cover without having to use the truck tailgate.

It is a further object of this invention to produce a cover for a pick-up truck bed that can be dismantled quickly for storage and then carried in the pick-up bed until needed.

DETAILED DESCRIPTION OF THE INVENTION

Figure 1:
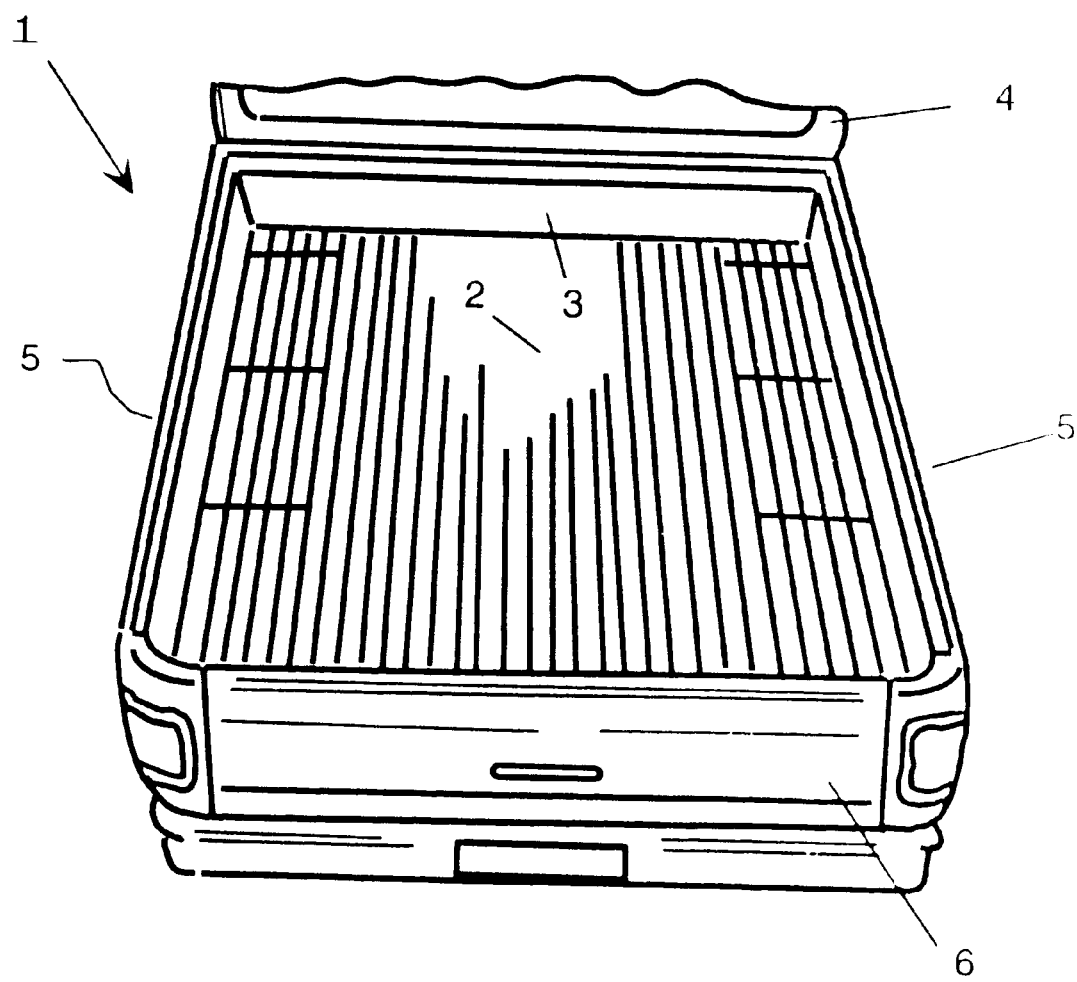
FIG. 1 is a detail view of a typical pick-up truck bed.

Referring now to FIGS. 1, a typical pick-up truck bed 1 is shown. This pick-up truck bed 1 has a floor 2 a front wall 3 that sits just behind the truck cab 4, two side walls 5 and a tail gate 6.

Figure 2:
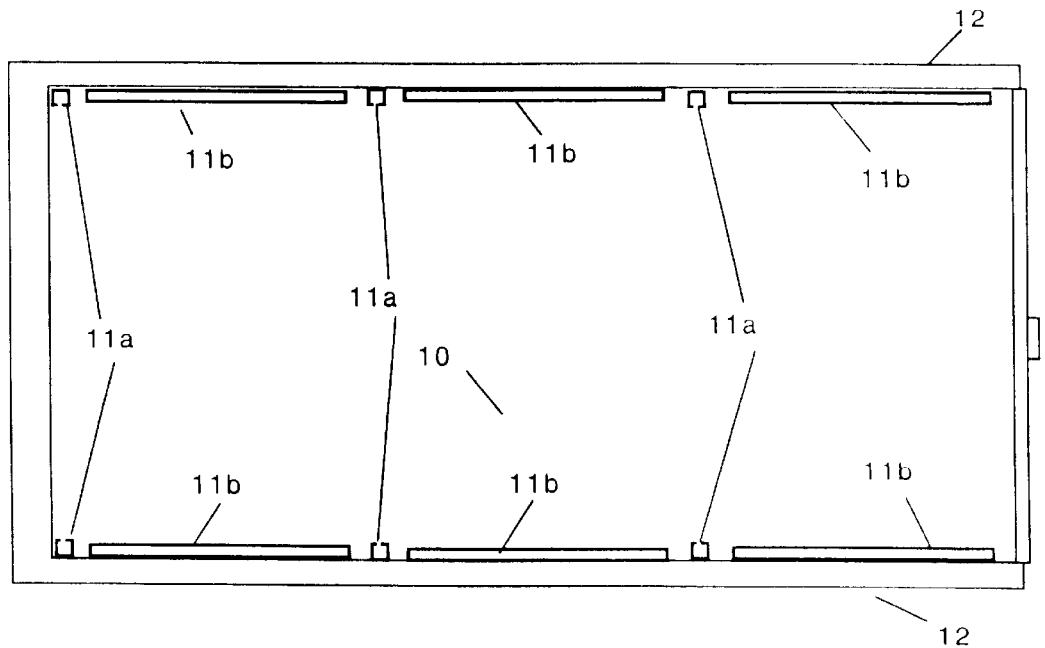
FIG. 2 is a top view of a pick-up truck bed modified to hold my invention.
Figure 5:
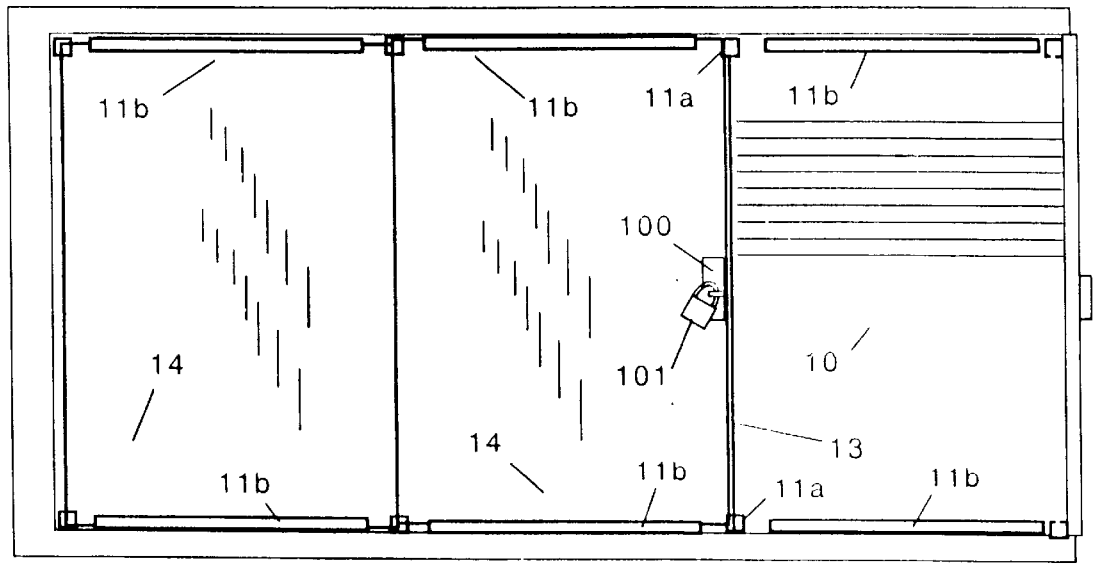
FIG. 5 is a top view of a pick-up truck bed with the first two sections of my invention installed.
Figure 6:
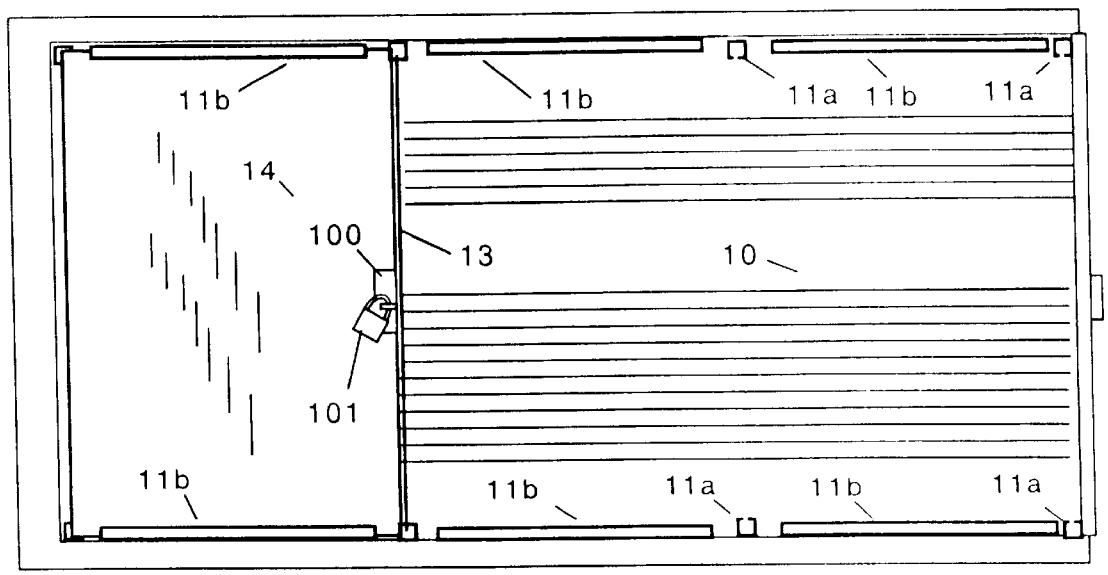
FIG. 6 is a top view of a pick-up truck bed with only the first section installed.
Figure 7:
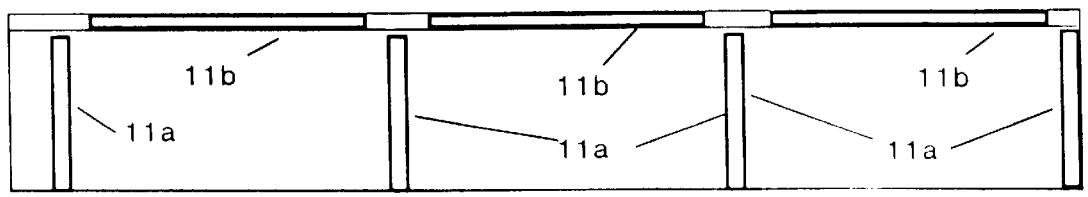
FIG. 7 is a side view of the inside of a pick-up truck bed showing the support rails in place.

Referring now to FIGS. 2–12, the first embodiment of the invention is shown. This embodiment makes modifications to the existing pick-up truck bed 1 to accommodate placement of the security covers. FIG. 2 shows a pick-up bed 10 that has a number of square channels placed therein. Two types of channels are shown. First, are pairs of vertical channels 11a. Second, are pairs of horizontal channels 11b. FIG. 7 shows a side view of the truck bed 10 showing the placement of the channels 11a and 11b on the side wall 12 of the truck. The channels 11a and 11b are attached to the truck wall using standard hardware and other fasteners. Because these channels are attached to the bed 10 directly, this embodiment is not preferred.

Figure 3:
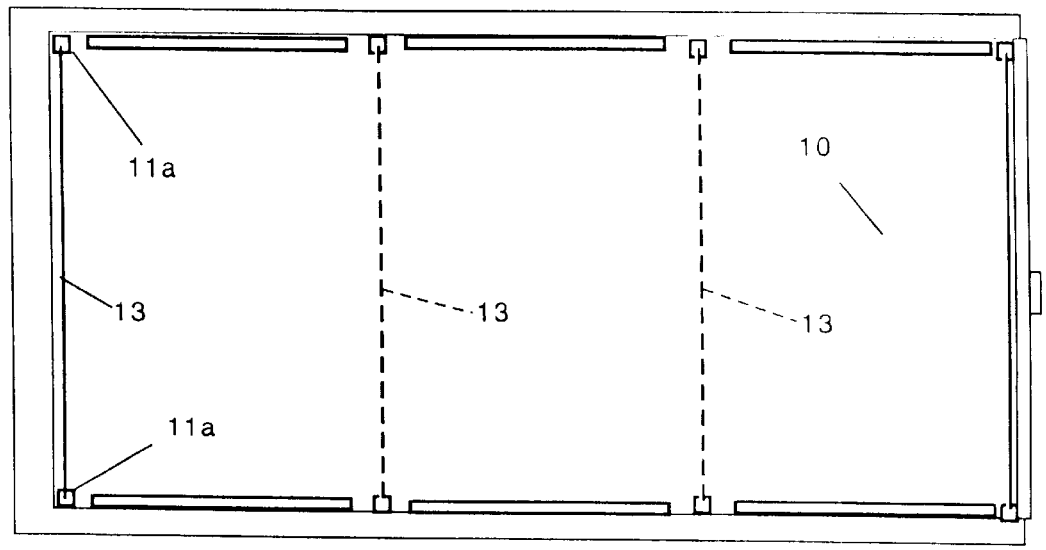
FIG. 3 is a top view of a pick-up truck bed showing placement of the vertical wall section.

The channels 11a and 11b are used to support a number of panels that enclose either a portion of the bed or the entire bed. FIG. 3 shows a vertical section 13 in place in the channel 11a. The dashed lines indicate alternative placements of the vertical section 13 along the bed 10.

Figure 4:
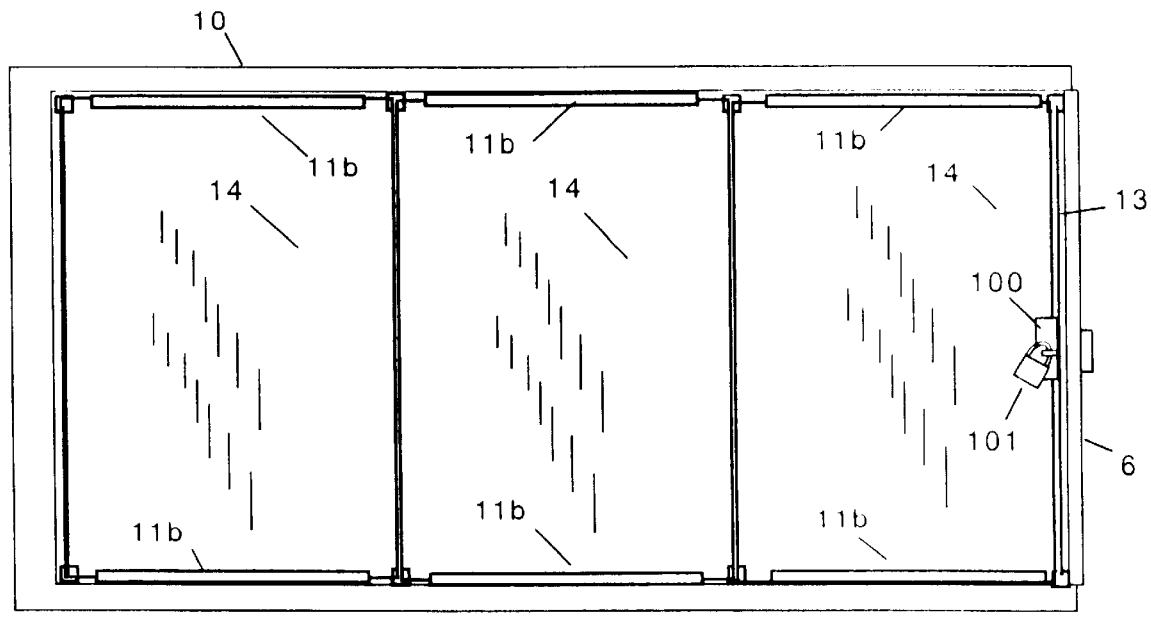
FIG. 4 is a top view of a pick-up truck bed with my invention fully installed.

To secure items in the truck bed 10, a number of covers 14 are used. These covers are rectangular sections that fit within the horizontal channels 11b. FIG. 4 shows all the panels in place, covering the entire bed. Here, three panels 14 are slid into place in the channels 11b. As shown on FIG. 7, the vertical channels 11a do not extend above the horizontal channels 11b that allows the cover sections 14 to fit over the vertical channels 11b when more than one cover panel 14 is used. A vertical panel 13 is used to enclose the rear portion of the bed 10, even with the tailgate in place. This is because the tailgate can be opened, leaving the interior contents exposed if the vertical panel is not used. A locking hasp is placed on the cover panels 14 and on the vertical panel 13 to lock the panels shut. Once shut and locked, any items stored within the covers are protected from the weather and from theft.

FIG. 5 shows a configuration where only two covers 14 are used. Here, the vertical panel 13 is moved forward to the appropriate vertical channels 11a as needed to secure that section of the bed 10. This allows a portion of the bed to remain open to carry larger gear, or when the items to be secured do not take up much space.

FIG. 6 shows the configuration where only one cover 14 is used. As before, the vertical panel 13 is moved forward to the appropriate vertical channel 11a to secure that portion of the bed. In this way, only that portion of bed that needs to be covered is covered. This system, therefore, creates a versatile and flexible storage system for pick-up truck beds. If none of the covers are needed, the covers can be stacked and locked together using the hasps to keep them secure either in the bed or another area.

Figure 8:
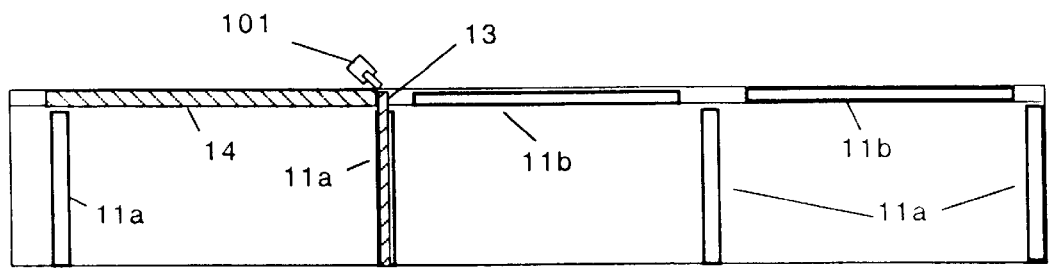
FIG. 8 is a cross-sectional view of the inside of a pick-up truck bed with the first section installed.
Figure 9:
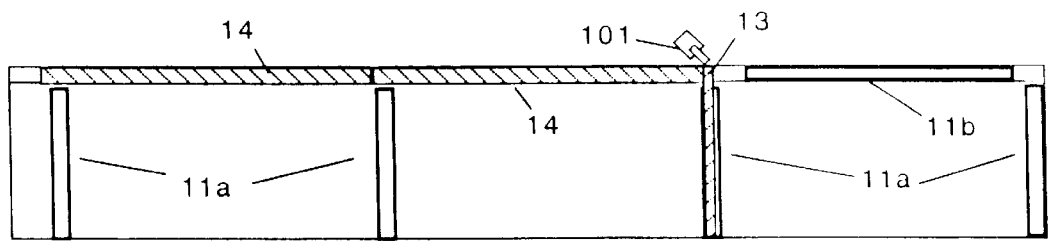
FIG. 9 is a cross-sectional view of the inside of a pick-up truck bed with the first and second sections installed.
Figure 10:
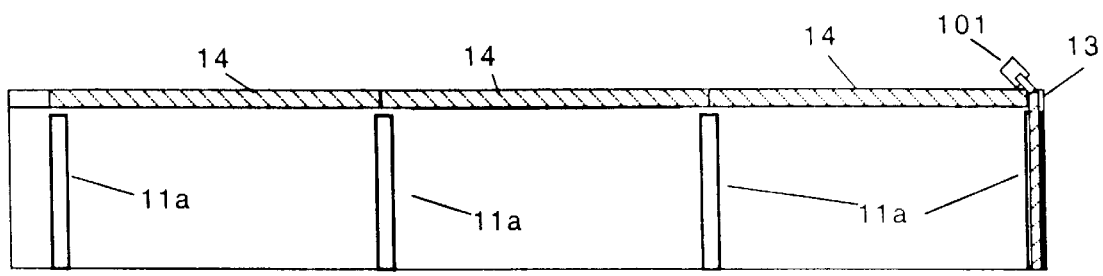
FIG. 10 is a cross-sectional view of the inside of a pick-up truck bed with the invention fully installed.

FIGS. 8, 9 and 10 show cross-sectional views of the placements for a single cover, a double cover and for the full bed. These figures correspond to the top view mentioned above.

Figure 11:
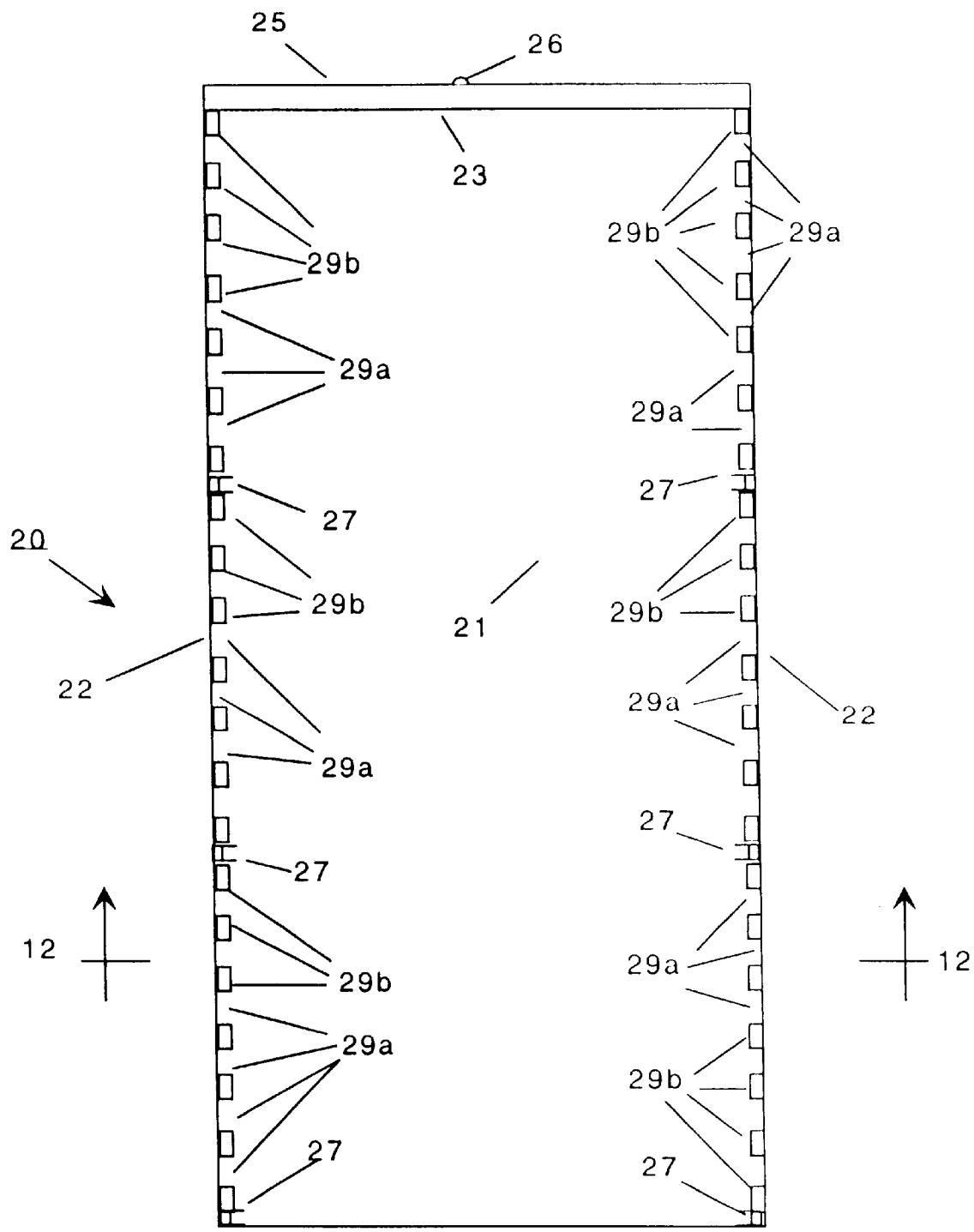
FIG. 11 is a top view of the second embodiment of my invention.
Figure 12:
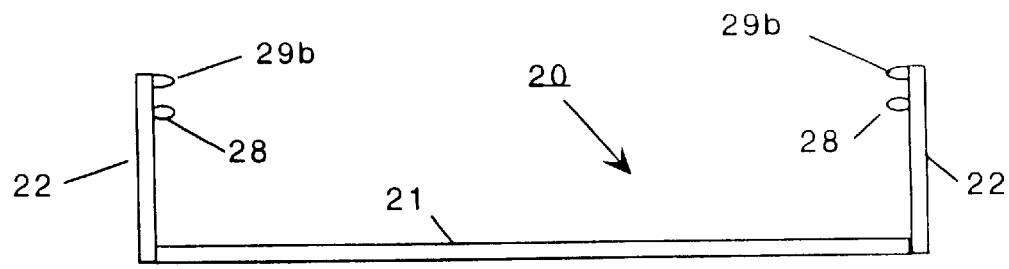
FIG. 12 is a sectional view of the second embodiment taken along the lines 12—12 of FIG. 11.

Referring now to FIGS. 11–15, the preferred embodiment is shown. In this embodiment, a molded bed liner 20 is used instead of attaching the channel components to the walls of the bed. By using a molded bed liner, no major modifications need to made to the truck. FIG. 11 shows a top view of the bed liner 20. The bed liner 20 has a bottom 21, two side walls 22, and a front wall 23. The back of the bed liner 20 is open, to accommodate the truck's tailgate. At the front of the bed liner 20 is a partition wall 25. The partition wall 25 is used to create a space between the front wall 23 and the panel slots. This space is needed to ensure that the front cover panel completely seals the bed liner 20. This space is also used to secure the cover panels and the vertical panel when the storage system is not needed. A locking hasp 26 is provided to lock the cover panels in the partition for storage.

The bed liner 20 has a number of pairs of vertical channels 27, to accommodate a vertical panel 27a as before. Unlike the first embodiment, that used square channels to hold the cover panels, this embodiment uses a lower rail 28 that is formed into the wall of the bed liner 20 (see FIG. 12). Above rail 28 is a slotted channel. The slotted channel has a number of slots 29a and a corresponding number of tabs 29b.

Figure 13:
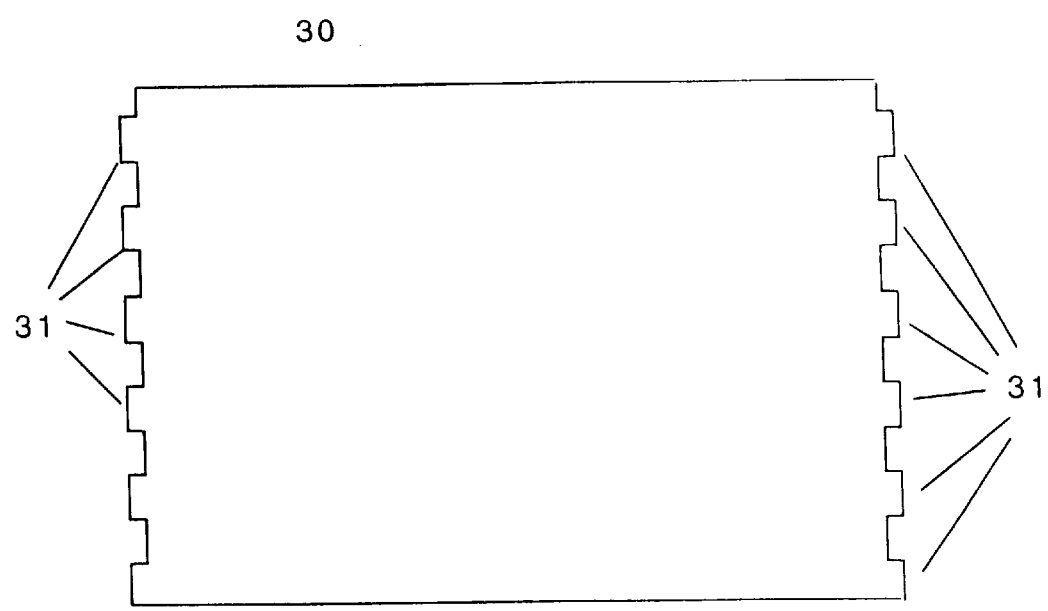
FIG. 13 is a top view of one cover section of the second embodiment of my invention.

FIG. 13 shows a cover panel 30 for the second embodiment. This panel has a generally rectangular shape, but has side edges that are cut with slots as shown. The cover panel also has a number of tabs 31 that correspond to the tabs 29b in the bed liner.

Figure 14:
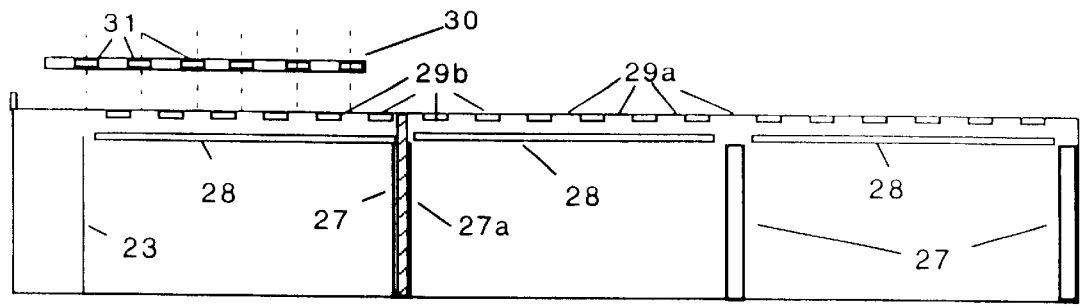
FIG. 14 is a cross-sectional view of the bed liner of the second embodiment with a cover piece aligned for placement and with the vertical piece installed.
Figure 15:
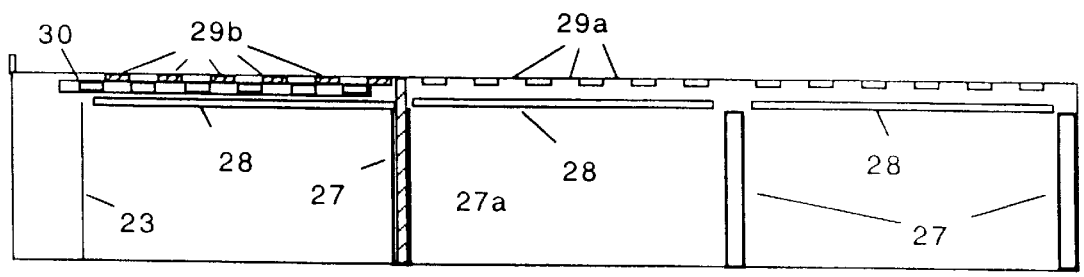
FIG. 15 is a cross-sectional view of the bed liner of the second embodiment with a cover piece placed between the slots of the bed liner and with the vertical piece installed.
Figure 16:
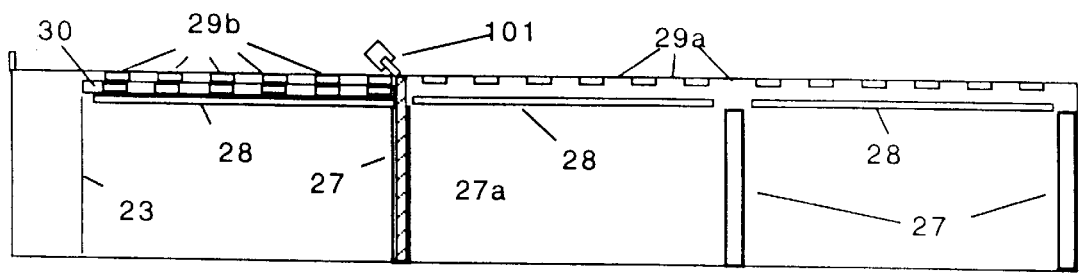
FIG. 16 is a cross-sectional view of the bed liner of the second embodiment with a cover piece slid into place, with the vertical piece installed and with the lock in place.

FIGS. 14–16 show how this system is used. FIG. 14 shows how the installation process begins: a cover panel 30 is aligned above the slotted channel until the tabs 31 in the panel align with the slots 29a in the bed liner 20. The cover panel 30 then drops down until the tabs 31 rest on the rail 28. This is shown in FIG. 15. The cover panel 30 is then pushed backward or forward as needed until the tabs 31 are under the tabs 29b. In this way, the cover panel 30 cannot be readily lifted out of the slotted channel 29. After the cover panel 30 is pushed forward, the back edge of the cover panel 30 is aligned with the forward edge of the vertical channels 27. A vertical panel 27a is then slid into position behind the cover panel 30. See FIG. 16. This provides a single panel enclosure. If more cover panels are used, they are installed in the same manner as the first cover panel. However, only one vertical panel 27a is used. This is placed at the back of the last cover panel 30, as in the case of the first embodiment. A lock 101 is provided to secure the cover panel 30 and the vertical panel 27a thereby preventing unauthorized access to the covered storage area. This is the same locking system as used in the first embodiment.

Figure 17:
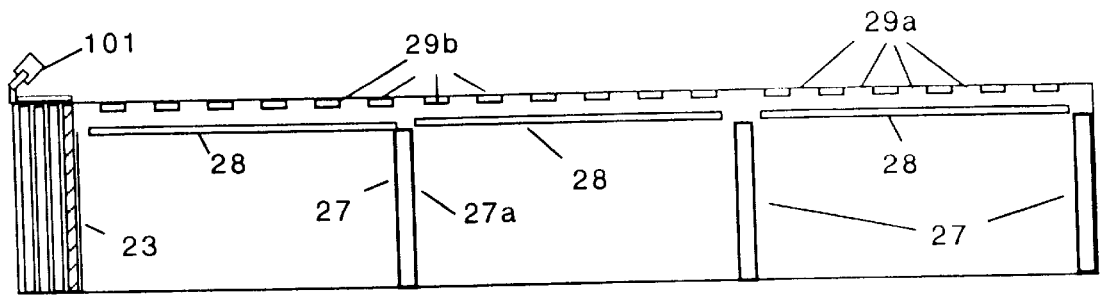
FIG. 17 is a cross-sectional view of the bed liner of the second embodiment with the cover pieces and the vertical piece stored in the forward storage compartment.

FIG. 17 shows how the cover pieces 30 and the vertical piece 27a are stored when they are not needed. In this embodiment, the pieces are stored in the forward storage area as shown. The lock is used with standard hasp hardware to lock the covers in place as shown.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A covering system for a pick-up truck bed, having two oppositely side walls, comprising:

a) A bed liner, removably installed within said pick-up truck bed, said bed liner having a floor, a front wall, and two oppositely disposed sides, said bed liner being shaped to fit a pick-up truck bed;

b) a lower pair of horizontal rails, fixedly attached to the sides of said bed liner, said lower pair of horizontal rails being coplanar and being oppositely disposed on said sides;

c) an upper pair of horizontal rails, fixedly attached to the sides of said bed liner, said upper pair of horizontal rails being coplanar and being oppositely disposed on said sides, said upper pair of horizontal rails further including a plurality of slots formed therein;

d) at least one pair of vertical channels, fixedly attached to said sides, wherein said pair of vertical channels are aligned in a single plane;

e) at least one cover plate, having a plurality of tabs formed thereon, such that said tabs align with said slots in said pair of upper rails, and further such that when said tabs align with said slots in said upper rail, said cover plate passed through said pair of upper rails and rests on said pair of lower rails, and further such that when said cover plate rests on said pair of lower horizontal rails, said cover plate is slidably engaged on said pair of lower horizontal rails;

f) a rear plate, slidably engaged in said pair of vertical channels and further such that said rear plate abuts said cover plate; and g) a means for lockably securing said cover plate to said rear plate.

2. The covering system of claim 1 further comprising: a second cover plate, being removably positionable in said pair of upper and lower rails, such that said second cover plate lies behind said first cover plate and abuts against it, and further comprising a second pair of vertical channels, wherein said rear plate is positioned in said second pair of vertical channels behind said second cover plate.

3. The covering system of claim 2 further comprising: a third cover plate, being removably positionable in said pair of upper and lower rails, such that said third cover plate lies behind said second cover plate and abuts against it, and further comprising a third pair of vertical channels, wherein said rear plate is positioned in said third pair of vertical channels behind said third cover plate.

* * * * *